US012729100B2

(12) United States Patent
Liou

(10) Patent No.: US 12,729,100 B2
(45) Date of Patent: Sep. 8, 2026

(54) ADJUSTABLE PRY BAR

(71) Applicant: Tang Chou Industrial Co., Ltd., Nantou County (TW)

(72) Inventor: Mou-Tang Liou, Taichung City (TW)

(73) Assignee: Tang Chou Industrial Co., Ltd., Nantou County (TW)

( * ) Notice: Subject to any disclaimer, the term of this patent is extended or adjusted under 35 U.S.C. 154(b) by 306 days.

(21) Appl. No.: 18/624,634

(22) Filed: Apr. 2, 2024

(65) Prior Publication Data

US 2025/0304418 A1 Oct. 2, 2025

(51) Int. Cl.
*B66F 15/00* (2006.01)
*B25B 23/00* (2006.01)

(52) U.S. Cl.
CPC .......... *B66F 15/00* (2013.01); *B25B 23/0035* (2013.01)

(58) Field of Classification Search
CPC . B25B 23/0035; B25B 23/0028; B66F 15/00; B25F 1/00; B25F 1/04; B25G 3/38; B25G 3/12; B25G 1/06; B25G 1/00; B25C 11/00; E04G 2023/085
USPC ........................................... 81/177.85; 7/166
See application file for complete search history.

(56) References Cited

U.S. PATENT DOCUMENTS 4,848,196 A * 7/1989 Roberts ............... B25B 23/0021 403/379.5
7,240,590 B1 * 7/2007 Lin ..................... B25B 23/0035 81/177.85
2004/0069978 A1 * 4/2004 Whelan .................... B25G 1/06 254/25
2012/0261628 A1 * 10/2012 Su .......................... B66F 15/00 254/129
2020/0002145 A1 * 1/2020 Liou ....................... B66F 15/00

FOREIGN PATENT DOCUMENTS

DE 102009030302 B3 * 11/2010 .............. B66F 15/00

OTHER PUBLICATIONS

Translation of DE 102009030302 B3 (Year: 2010).*
Search report from counterpart app DE102024122529A (Year: 2025).*
Search report from counterpart app TW113103835A (Year: 2025).*

* cited by examiner

*Primary Examiner* — David S Posigian
*Assistant Examiner* — Steven Huang
(74) *Attorney, Agent, or Firm* — MUNCY, GEISSLER, OLDS & LOWE, P.C.

(57) ABSTRACT

An adjustable pry bar includes a rod, a pry head, and a pivoting device. The pivoting device includes an engaging member, an axial member, and a positioning member. The engaging member is movably inserted through the rod and the pry head. The axial member is movably inserted through the pry head and the engaging member. The positioning member is movably disposed in the engaging member and is configured to enter the axial member as the axial member moves relative to the pry head and the engaging member, allowing the positioning member to selectively protrude from the engaging member and to be adapted for connecting to a driving tool.

10 Claims, 6 Drawing Sheets

ADJUSTABLE PRY BAR

BACKGROUND OF THE INVENTION

The present invention relates to a hand tool and, more particularly, to an adjustable pry bar adapted for connecting to a driving tool.

Conventional pry bars are designed for users to separate two joined objects or to remove nails. To enhance the functionality of pry bars, there are now pry bars with various additional features, such as adjustable length pry bars, pry bars with a hammerhead for hammering functions, or pry bars with magnets for attracting removed nails.

However, after using a pry bar, if a user immediately needs to tighten or loosen fasteners such as bolts or nuts, they still need to put down the pry bar and pick up a different type of driving tool to drive the fasteners. This process is not only time consuming and inconvenient but also requires carrying different driving tools depending on the job, there is still room for improvement in conventional pry bars.

Thus, a need exists for an adjustable pry bar to mitigate and/or obviate the above disadvantages.

SUMMARY OF THE INVENTION

In general, this disclosure describes an adjustable pry bar that includes a rod, a pry head, and a pivoting device. The rod has a first pivoting portion provided with a first engaging hole. The pry head has a second pivoting portion provided with a second engaging hole, a containing hole, and a containing slot communicating with the second engaging hole and the containing hole. The first pivoting portion is pivotally connected to the containing slot. The pivoting device includes an engaging member, an axial member, and a positioning member. The engaging member is movably inserted through the first engaging hole and the second engaging hole. The engaging member is provided with an engaging portion detachably engaged with the first engaging hole and normally engaged with the second engaging hole, a through hole penetrating therethrough, and a positioning hole radially communicating with the through hole. The axial member is movably inserted through the containing hole and the through hole and is provided with a positioning recess. The axial member is configured to drive the engaging member, allowing the engaging portion to disengage from the first engaging hole. The positioning member is movably disposed in the positioning hole and is configured to selectively enter the positioning recess as the axial member moves relative to the containing hole and the through hole, allowing the positioning member to selectively protrude from the engaging member and to be adapted for connecting to a driving tool.

The present invention will become clearer in light of the following detailed description of illustrative embodiments of this invention described in connection with the drawings.

DETAILED DESCRIPTION OF THE INVENTION

Figure 1:
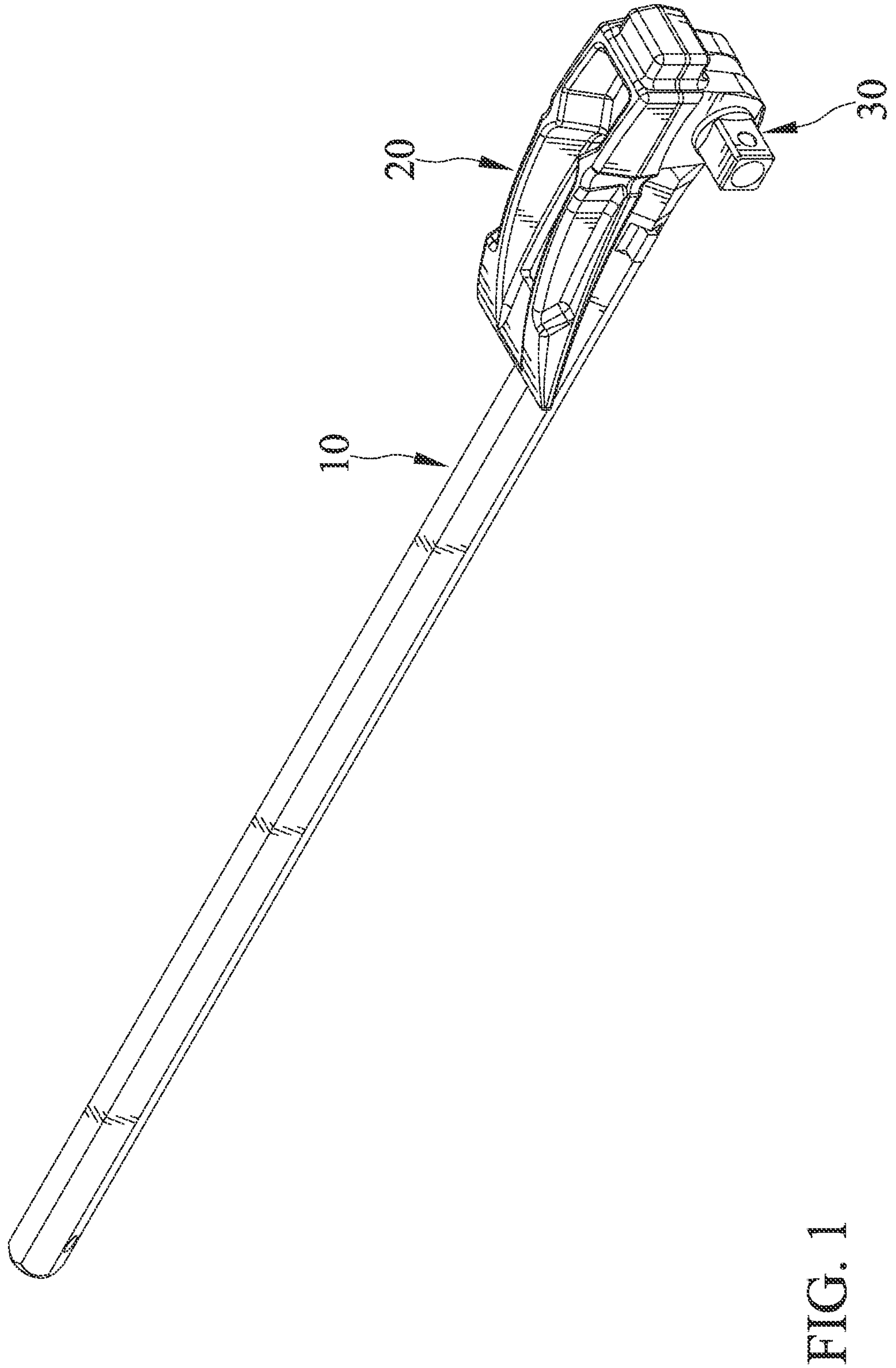
FIG. 1 is a perspective view of an adjustable pry bar of an embodiment according to the present invention.
Figure 2:
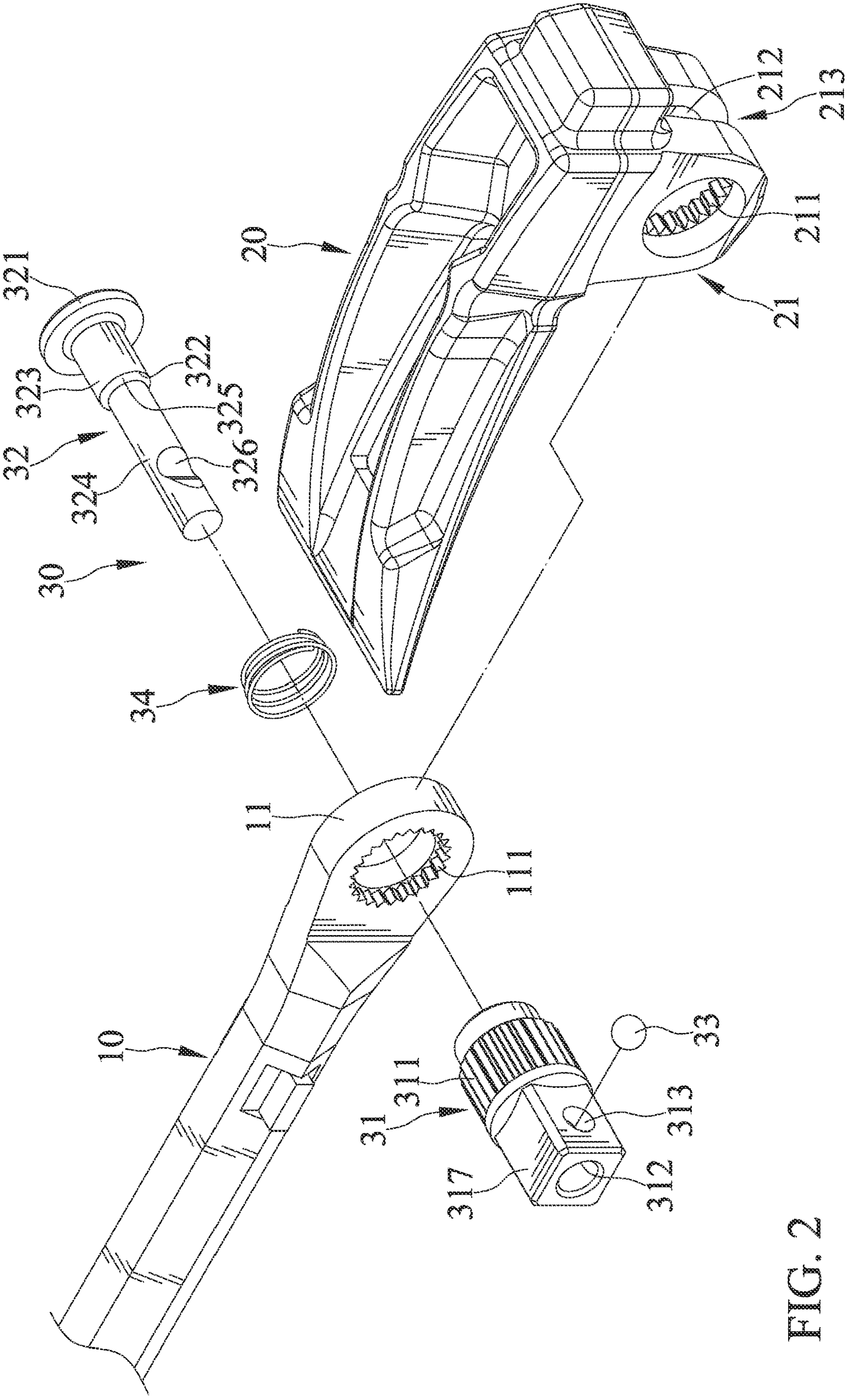
FIG. 2 is a partial exploded perspective view of the adjustable pry bar of FIG. 1.

FIGS. 1-6 show an adjustable pry bar of an embodiment according to the present invention. The adjustable pry bar includes a rod 10, a pry head 20, and a pivoting device 30. The rod 10 has a first pivoting portion 11 provided with a first engaging hole 111. The pry head 20 has a second pivoting portion 21 provided with a second engaging hole 211, a containing hole 212, and a containing slot 213 communicating with the second engaging hole 211 and the containing hole 212. The first pivoting portion 11 is pivotally connected to the containing slot 213. The pivoting device 30 includes an engaging member 31, an axial member 32, and a positioning member 33. The engaging member 31 is movably inserted through the first engaging hole 111 and the second engaging hole 211. The engaging member 31 is provided with an engaging portion 311 detachably engaged with the first engaging hole 111 and normally engaged with the second engaging hole 211, a through hole 312 penetrating therethrough, and a positioning hole 313 radially communicating with the through hole 312. The axial member 32 is movably inserted through the containing hole 212 and the through hole 312 and is provided with a positioning recess 326. The axial member 32 is configured to drive the engaging member 31, allowing the engaging portion 311 to disengage from the first engaging hole 111 to cause the pry head 20 adjustable an angle relative to the rod 10. The positioning member 33 is movably disposed in the positioning hole 313 and is configured to selectively enter the positioning recess 326 as the axial member 32 moves relative to the containing hole 212 and the through hole 312, allowing the positioning member 33 to selectively protrude from the engaging member 31 and to be adapted for connecting to a driving tool 90 such as a socket 90.

In the embodiment, the engaging member 31 is configured to be driven by the axial member 32 to switch between a locked position (FIG. 3) and an unlocked position (FIG. 5) along an axis A relative to the second engaging hole 211 and the first engaging hole 111. The axial member 32 is configured to switch between a first position (FIG. 3), a second position (FIG. 4), and a third position (FIG. 5) along the axis A relative to the containing hole 212 and the through hole 312. When the engaging member 31 is in the locked position and the axial member 32 is in the first position, the engaging portion 311 is engaged with the first engaging hole 111. When the engaging member 31 is in the locked position and the axial member 32 is in the second position, the positioning member 33 enters the positioning recess 326. When the engaging member 31 is in the unlocked position and the axial member 32 is in the third position, the engaging portion 311 is disengaged from the first engaging hole 111.

The through hole 312 penetrates opposite ends of the engaging member 31 along the axis A. The axial member 32 is provided with a pressing portion 321 disposed in the containing hole 212, and a body 322 extending from the pressing portion 321 along the axis A. The body 322 selectively abuts the engaging member 31 to drive the engaging member 31.

Further, the through hole 312 is provided with a large diameter portion 314 and a small diameter portion 315 along the axis A. The body 322 is provided with a large diameter section 323 extending from the pressing portion 321 along the axis A and corresponding to the large diameter portion 314, and a small diameter section 324 extending from the large diameter section 323 and corresponding to the small diameter portion 315. The positioning recess 326 is formed in the small diameter section 324. Thus, the contact area between the engaging member 31 and the axial member 32 is increased to avoid the problem of damage due to stress concentration.

Furthermore, the through hole 312 is further provided with a first shoulder 316 located between the large diameter portion 314 and the small diameter portion 315 along the axis A. The body 322 is further provided with a second shoulder 325 located between the large diameter section 323 and the small diameter section 324 along the axis A. The second shoulder 325 abuts against the first shoulder 316 when the axial member 32 is in the second and third positions.

Additionally, the engaging member 31 is further provided with a connecting portion 317 extending from the engaging portion 311. The positioning hole 313 is formed on the connecting portion 317. The body 322 is further provided with a limiting portion 327 extending from the small diameter section 324 and protruding from the small diameter portion 315. The limiting portion 327 selectively abuts the connecting portion 317.

In the embodiment, the connecting portion 317 may have a quadrangular prism shape and is adapted for connecting to the socket 90. At least a part of an inner surface of the first engaging hole 111, at least a part of an inner surface of the second engaging hole 211, and at least a part of an outer surface of the engaging portion 311 are provided with corresponding teeth.

The pivoting device 30 further includes a biasing member 34 configured to bias the axial member 32 towards the first position. The biasing member 34 has opposite ends respectively elastically abutting against the first pivoting portion 11 and the pressing portion 321 along the axis A, allowing the axial member 32 to remain in the first position without external force. In the embodiment, the biasing member 34 may be a torsion spring and sleeves around the body 322.

Figure 3:
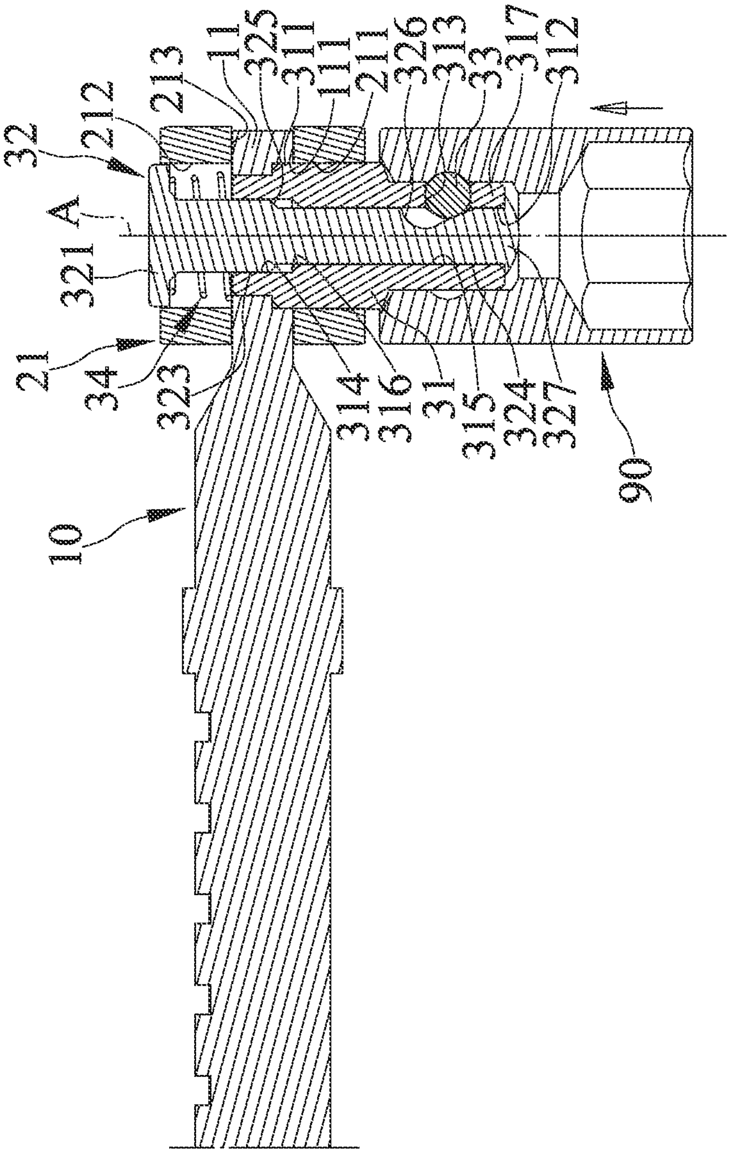
FIG. 3 is a cross sectional view of the adjustable pry bar of FIG. 1 and shows the engaging member in the locked position and the axial member in the first position.

Please refer to FIG. 3, the engaging member 31 is in the locked position and the axial member 32 is in the first position. The engaging portion 311 of the engaging member 31 is engaged with both the first engaging hole 111 and the second engaging hole 211. The limiting portion 327 of the axial member 32 abuts against the connecting portion 317, and the second shoulder 325 does not abut against the first shoulder 316. The positioning member 33 protrudes from the positioning hole 313 of the engaging member 31 and connects to the socket 90. The biasing member 34 is not compressed. Thus, the pry head 20 cannot adjust the angle relative to the rod 10.

Figure 4:
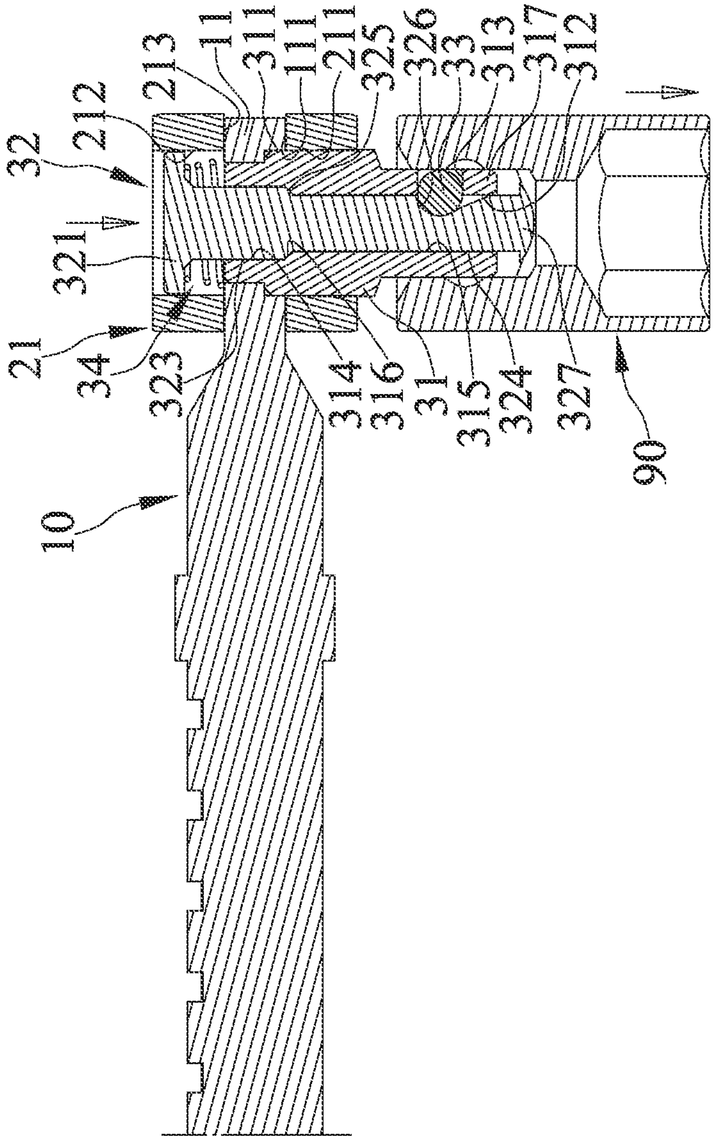
FIG. 4 is a continued view of FIG. 3 and shows the engaging member in the locked position and the axial member in the second position.

Next, please refer to FIG. 4, the pressing portion 321 of the axial member 32 is pressed by an external force, causing the axial member 32 to move relative to the containing hole 212 and the through hole 312 from the first position to the second position. The biasing member 34 is slightly compressed, and the engaging member 31 remains in the locked position. The engaging portion 311 of the engaging member 31 is engaged with both the first engaging hole 111 and the second engaging hole 211. The limiting portion 327 of the axial member 32 disengages from the connecting portion 317, and the second shoulder 325 abuts against the first shoulder 316. The positioning member 33 retracts into the positioning hole 313 of the engaging member 31 and enters the positioning recess 326 of the axial member 32, thereby disengaging from the socket 90, allowing the socket 90 to detach from the connecting portion 317.

Figure 5:
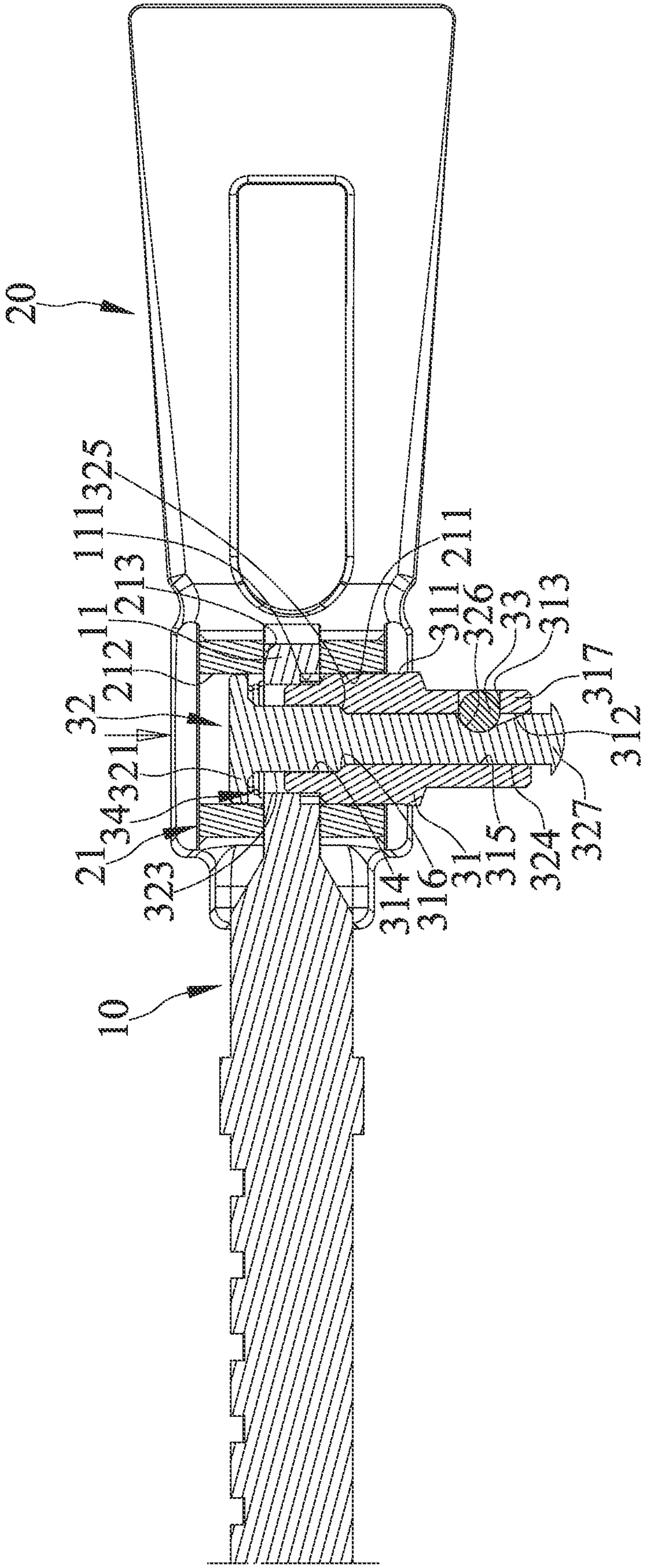
FIG. 5 is a continued view of FIG. 4 and shows the engaging member in the unlocked position and the axial member in the third position.
Figure 6:
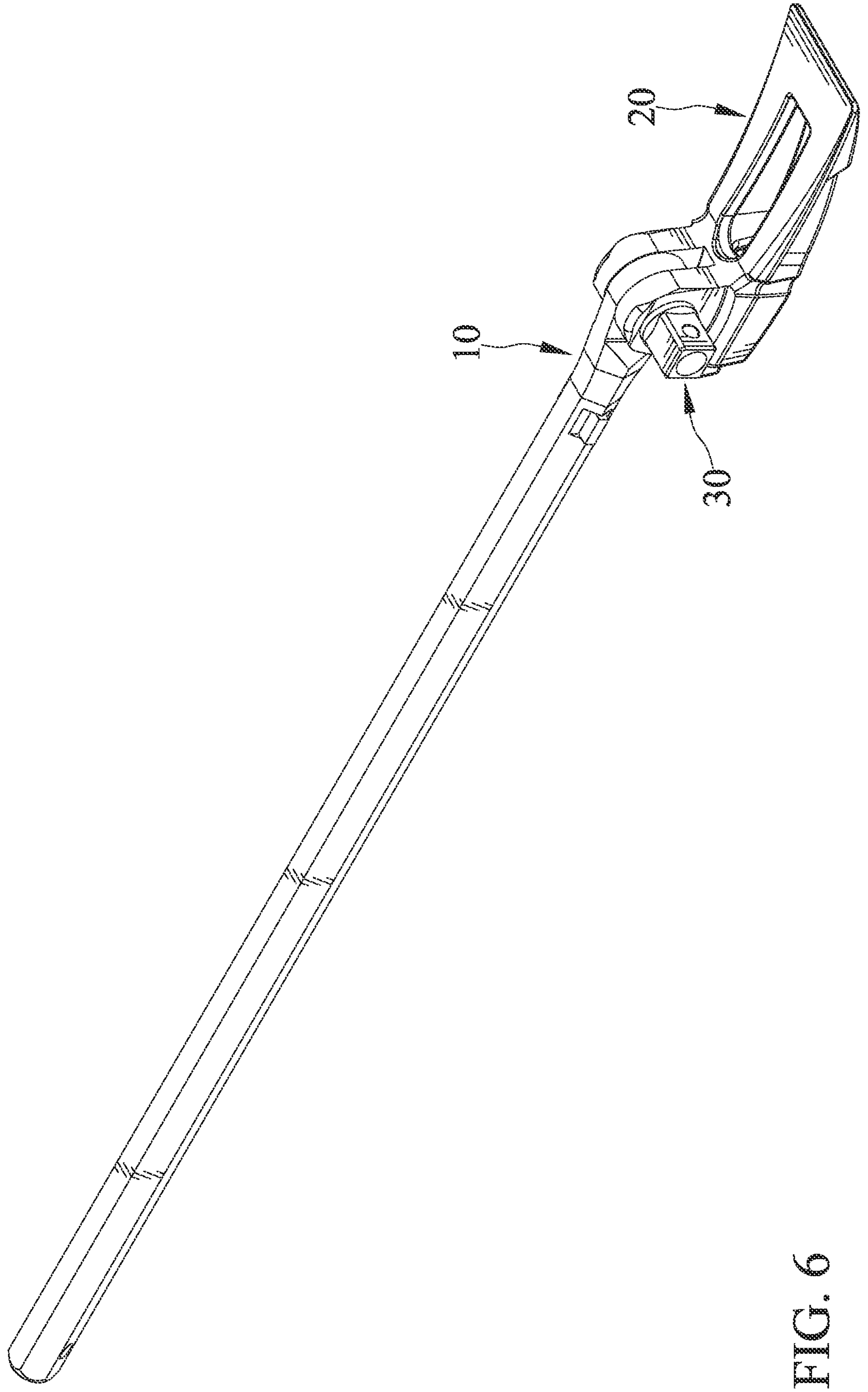
FIG. 6 is a continued view of FIG. 5 and shows the pry head adjusted the angle relative to the rod.

Please continue to refer to FIGS. 5 and 6, the pressing portion 321 of the axial member 32 is subjected to a greater external force, causing the axial member 32 to move relative to the containing hole 212 and the through hole 312 from the second position to the third position. The biasing member 34 is fully compressed, and the engaging member 31 is in the unlocked position. The engaging portion 311 of the engaging member 31 is disengaged from the first engaging hole 111, allowing the pry head 20 to adjust the angle relative to the rod 10. Once the external force on the pressing portion 321 of the axial member 32 is ceased, the axial member 32 is biased by the biasing member 34 from the third position back to the first position, also driving the engaging member 31 from the unlocked position back to the locked position.

Although specific embodiments have been illustrated and described, numerous modifications and variations are still possible without departing from the scope of the invention. The scope of the invention is limited by the accompanying claims.

The invention claimed is:

1. An adjustable pry bar comprising:

a rod having a first pivoting portion provided with a first engaging hole;

a pry head having a second pivoting portion provided with a second engaging hole, a containing hole, and a containing slot communicating with the second engaging hole and the containing hole, and wherein the first pivoting portion is pivotally connected to the containing slot; and a pivoting device including an engaging member, an axial member, and a positioning member, wherein the engaging member is movably inserted through the first engaging hole and the second engaging hole, wherein the engaging member is provided with an engaging portion detachably engaged with the first engaging hole and normally engaged with the second engaging hole, a through hole penetrating therethrough, and a positioning hole radially communicating with the through hole, wherein the axial member is movably inserted through the containing hole and the through hole and is provided with a positioning recess, wherein the axial member is configured to drive the engaging member, allowing the engaging portion to disengage from the first engaging hole, wherein the positioning member is movably disposed in the positioning hole and is configured to selectively enter the positioning recess as the axial member moves relative to the containing hole and the through hole, allowing the positioning member to selectively protrude from the engaging member and to be adapted for connecting to a driving tool.

2. The adjustable pry bar as claimed in claim 1, wherein the engaging member is configured to be driven by the axial member to switch between a locked position and an unlocked position along an axis relative to the second engaging hole and the first engaging hole, wherein the axial member is configured to switch between a first position, a second position, and a third position along the axis relative to the containing hole and the through hole;

wherein when the engaging member is in the locked position and the axial member is in the first position, the engaging portion is engaged with the first engaging hole;

wherein when the engaging member is in the locked position and the axial member is in the second position, the positioning member enters the positioning recess;

wherein when the engaging member is in the unlocked position and the axial member is in the third position, the engaging portion is disengaged from the first engaging hole.

3. The adjustable pry bar as claimed in claim 2, wherein the through hole penetrates opposite ends of the engaging member along the axis, wherein the axial member is provided with a pressing portion disposed in the containing hole, and a body extending from the pressing portion along the axis, and wherein the body selectively abuts the engaging member to drive the engaging member.

4. The adjustable pry bar as claimed in claim 3, wherein the pivoting device further includes a biasing member configured to bias the axial member towards the first position, and wherein the biasing member has opposite ends respectively elastically abutting against the first pivoting portion and the pressing portion along the axis.

5. The adjustable pry bar as claimed in claim 4, wherein the biasing member is a torsion spring and sleeves around the body.

6. The adjustable pry bar as claimed in claim 2, wherein the through hole is provided with a large diameter portion and a small diameter portion along the axis, wherein the body is provided with a large diameter section extending from the pressing portion along the axis and corresponding to the large diameter portion, and a small diameter section extending from the large diameter section and corresponding to the small diameter portion, and wherein the positioning recess is formed in the small diameter section.

7. The adjustable pry bar as claimed in claim 6, wherein the through hole is further provided with a first shoulder located between the large diameter portion and the small diameter portion along the axis, wherein the body is further provided with a second shoulder located between the large diameter section and the small diameter section along the axis, and wherein the second shoulder abuts against the first shoulder when the axial member is in the second and third positions.

8. The adjustable pry bar as claimed in claim 7, wherein the engaging member is further provided with a connecting portion extending from the engaging portion, wherein the positioning hole is formed on the connecting portion, wherein the body is further provided with a limiting portion extending from the small diameter section and protruding from the small diameter portion, and wherein the limiting portion selectively abuts the connecting portion.

9. The adjustable pry bar as claimed in claim 8, wherein the connecting portion has a quadrangular prism shape and is adapted for connecting to the driving tool.

10. The adjustable pry bar as claimed in claim 8, wherein at least a part of an inner surface of the first engaging hole, at least a part of an inner surface of the second engaging hole, and at least a part of an outer surface of the engaging portion are provided with corresponding teeth.

* * * * *